(12) United States Patent
Yu et al.

(10) Patent No.: US 12,548,223 B2
(45) Date of Patent: Feb. 10, 2026

(54) ULTRA-FAST-PITCH ACQUISITION AND RECONSTRUCTION IN HELICAL COMPUTED TOMOGRAPHY

(71) Applicant: Mayo Foundation for Medical Education and Research, Rochester, MN (US)

(72) Inventors: Lifeng Yu, Byron, MN (US); Hao Gong, Rochester, MN (US); Liqiang Ren, Rochester, MN (US); Cynthia H. McCollough, Byron, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 695 days.

(21) Appl. No.: 17/799,596

(22) PCT Filed: Feb. 15, 2021

(86) PCT No.: PCT/US2021/018112
§ 371 (c)(1),
(2) Date: Aug. 12, 2022

(87) PCT Pub. No.: WO2021/163662
PCT Pub. Date: Aug. 19, 2021

(65) Prior Publication Data
US 2023/0097196 A1    Mar. 30, 2023

Related U.S. Application Data

(60) Provisional application No. 62/976,807, filed on Feb. 14, 2020.

(51) Int. Cl.
*G06T 11/00* (2006.01)

(52) U.S. Cl.
CPC .......... *G06T 11/006* (2013.01); *G06T 11/008* (2013.01); *G06T 2210/41* (2013.01); *G06T 2211/441* (2023.08)

(58) Field of Classification Search
CPC . G06T 11/006; G06T 11/008; G06T 2210/41; G06T 2211/441; G06T 2211/412;
(Continued)

(56) References Cited

U.S. PATENT DOCUMENTS

| 5,485,493 | A | * | 1/1996 | Heuscher | G16H 30/40 |
| | | | | | 378/19 |
| 2008/0253505 | A1 | * | 10/2008 | Imai | A61B 6/032 |
| | | | | | 378/8 |

(Continued)

OTHER PUBLICATIONS

Hsieh, J. et al., A New Era of Image Reconstruction: TrueFidelity (TM), Technical White Paper on Deep Learning Image Reconstruction, Copyright 2019 General Electric Company, pp. 1-15.
(Continued)

*Primary Examiner* — Nimesh Patel
(74) *Attorney, Agent, or Firm* — Quarles & Brady LLP (57) ABSTRACT

Images are reconstructed from data acquired using an ultra-fast-pitch acquisition with a CT system. As an example, an ultra-fast-pitch acquisition mode in single-source helical CT ($\geq 1.5$) can be used to acquire data. A trained machine learning algorithm, such as a neural network, is used to reconstruct images in which artifacts associated with insufficient data acquired in the ultra-fast-pitch mode are reduced. An example neural network can include customized functional modules using both local and non-local operators, as well as the z-coordinate of each image, to effectively suppress the location- and structure-dependent artifacts induced by the ultra-fast-pitch mode. The machine learning algorithm can be trained using a customized loss function that
(Continued)

involves image-gradient-correlation loss and feature reconstruction loss.

14 Claims, 7 Drawing Sheets

(58) Field of Classification Search
CPC ............. G06T 11/005; G06T 2211/421; G06T 2207/10081; G06T 2207/30004; G06T 7/0012; G06T 11/003; G06T 5/70; G06T 2207/20081; G06T 2207/20104; G06T 2207/20212; G06T 5/00; G06T 7/337; G06T 7/38; G06T 1/0007; G06T 2211/416; G06T 7/97; G06T 2211/428; G06T 7/30; G06T 17/00; G06T 2200/08; G06T 2207/30168; G06T 2211/40; G06T 2211/404; G06T 2207/20084; G06T 7/11; G06T 2207/10104; G06T 19/20; G06T 2207/10101; G06T 2207/10116; G06T 2207/20221; G06T 7/00; G06T 2207/10132; G06T 15/00; G06T 2207/10028; G06T 2207/10072; G06T 2207/10088; G06T 2207/10108; G06T 2207/10004; G06T 5/60; G06T 3/40; G06T 7/136; G06T 7/74; G06T 2207/20036; G06T 5/50; G06T 7/0002; G06T 7/248; G06T 7/344; G06T 7/579; A61B 6/032; A61B 6/027; A61B 6/5205; A61B 6/541; A61B 6/542; A61B 6/504; A61B 6/4266; A61B 5/352; A61B 6/03; A61B 6/035; A61B 6/037; A61B 6/469; A61B 6/484; A61B 6/50; A61B 6/5229; A61B 5/055; A61B 6/12; A61B 2090/364; A61B 8/5284; A61B 34/10; A61B 90/36; A61B 6/5247; A61B 6/5264; A61B 6/025; A61B 6/4028; A61B 6/463; A61B 5/0013; A61B 6/022; A61B 6/04; A61B 6/4258; A61B 2034/2055; A61B 2034/2065; A61B 2090/3735; A61B 5/004; A61B 5/00; A61B 2090/367; A61B 2576/00; A61B 17/1703; A61B 2017/0092; A61B 2090/374; A61B 2090/376; A61B 6/5235; A61B 6/5223; A61B 2034/105; A61B 2034/108; Y10S 378/901; Y10S 128/922; G01N 23/046; G01N 2223/419; G01N 2223/401; G01N 2223/408; G01N 2223/33; G01N 23/044; G01N 2223/42; G01N 2223/1016; G01N 2223/423; G01N 2223/612; G01N 23/04; G01V 5/22; G01V 5/226; G06N 3/04; G06N 3/08; G06N 20/00; G06N 3/045; G06N 3/088; G06N 3/02; G06N 3/048; G06N 3/0464; G06N 3/0475; G06N 3/09; G06N 3/094; G06N 3/096; G06N 3/044; G06N 3/049; G06N 3/091; G06V 10/25; G06V 10/82; G06V 2201/03; G06V 10/764; G06V 10/147; G06V 10/20; G06V 10/26; A61N 5/1048; A61N 2005/1061; A61N 5/1067; A61N 5/107; A61N 5/1081; A61N 5/1082; G06F 18/22; G06F 2218/08; G06F 2218/12; G06F 18/10; G06F 18/241; G06F 18/2413; G06F 16/00; G06F 17/10; G06F 30/00; G06F 30/27; G16H 30/40; G16H 30/20; G16H 50/70; G16H 10/60; G16H 40/67; G16H 40/63; G16H 15/00; G16H 20/00; G16H 80/00; G16H 30/00
See application file for complete search history.

(56) References Cited

U.S. PATENT DOCUMENTS

| | | | |
|---|---|---|---|
| 2016/0252467 A1* | 9/2016 | Thompson | G01N 23/046 378/20 |
| 2017/0108453 A1* | 4/2017 | Foland | G01N 23/046 |
| 2017/0273647 A1* | 9/2017 | Schafer | A61B 6/032 |
| 2018/0110480 A1* | 4/2018 | Suzuki | G06T 1/0007 |
| 2019/0104940 A1 | 4/2019 | Zhou et al. | |
| 2019/0108904 A1 | 4/2019 | Zhou et al. | |

OTHER PUBLICATIONS

International Search Report of related PCT/US2021/018112, mailed on Aug. 2, 2021, 3 pages.
Written Opinion of related PCT/US2021/018112, mailed on Aug. 2, 2021, 6 pages.
Gong, Hao, et al. "Ultra-fast-pitch acquisition and reconstruction in helical CT." Medical Imaging 2020: Physics of Medical Imaging. vol. 11312. SPIE, 2020. pp. 1-4.
Han, Y., Kang, J., & Ye, J. C. (2018). Deep learning reconstruction for 9-view dual energy CT baggage scanner. arXiv preprint arXiv:1801.01258. pp. 1-4.
Wang, Shengping, et al. "3D convolutional neural network for differentiating pre-invasive lesions from invasive adenocarcinomas appearing as ground-glass nodules with diameters≤ 3 cm using HRCT." Quantitative imaging in medicine and surgery 8.5 (2018): 491-499.
Zheng, Ao, et al. "A cascaded dual-domain deep learning reconstruction method for sparsely spaced multidetector helical CT." arXiv preprint arXiv:1910.03746 (2019): 1-12.

* cited by examiner

ULTRA-FAST-PITCH ACQUISITION AND RECONSTRUCTION IN HELICAL COMPUTED TOMOGRAPHY

CROSS-REFERENCE TO RELATED APPLICATIONS

This application represents the national stage entry of PCT/US2021/018112 filed on Feb. 15, 2021 and claims the benefit of U.S. Provisional Patent Application Ser. No. 62/976,807 filed on Feb. 14, 2020 and entitled "Ultra-Fast-Pitch Acquisition and Reconstruction in Helical Computed Tomography," the contents of which is incorporated herein by reference as if set forth in its entirety for all purposes.

STATEMENT REGARDING FEDERALLY SPONSORED RESEARCH

N/A

BACKGROUND

Helical scan is the most commonly used data acquisition mode in clinical CT. Even with a detector as wide as 16 cm, most of the routine exams are performed using helical mode with a detector collimation between 2 and 8 cm so that image quality is not sacrificed from cone-beam artifacts. The helical pitch is typically set under 1.5, or preferably under 1.0 to reduce helical artifacts. On a single source scanner, the scanning speed is still quite limited. For example, for a helical scan with a 6 cm detector collimation, a rotation time of 0.5 second, and a pitch of 1.0, the longitudinal coverage speed is 12 cm per second, which is fine for many routine exams, but less than sufficient for exams involving significant patient motion, such as pediatric, chest, and some cardiovascular exams. A pitch higher than ~1.5 would improve the speed, but the acquired data would be insufficient to accurately reconstruct images within the entire scanning field of view.

One of the CT manufacturers implemented a fast-pitch mode (pitch as high as 3.4) on their dual-source CT scanners since the 2nd tube-detector system can fill the data gap for accurate image reconstruction. This fast-pitch mode can achieve a scanning speed as fast as 78 cm/sec, which has been demonstrated to be very beneficial in pediatric and cardiovascular CT. However, this is not achievable on single-source scanners.

SUMMARY OF THE DISCLOSURE

The present disclosure addresses the aforementioned drawbacks by providing a method for reconstructing an image of a subject from data acquired with a computed tomography (CT) system. Data are acquired with the CT system from the subject using an ultra-fast-pitch scan in which data are acquired using a helical scan with a pitch of more than 1.5. Scan geometry data that indicate how the data were acquired are also accessed by a computer system. One or more images of the subject are then reconstructed with the computer system by inputting the data and the scan geometry data to a trained machine learning algorithm, generating output as the one or more images of the subject, where image artifacts associated with the ultra-fast-pitch scan are mitigated in the one or more images of the subject.

It is another aspect of the present disclosure to provide a method for training a machine learning algorithm to reconstruct an image of a subject from data acquired with a computed tomography (CT) system. Training data are accessed with a computer system. The training data include training CT data comprising regular pitch data associated with a pitch less than or equal to 1.5 and ultra-fast-pitch data associated with a pitch of more than 1.5, and scan geometry data indicating how the CT data were acquired. A machine learning algorithm is trained on the training data using the computer system. Training the machine learning algorithm includes minimizing a loss function that includes an image-gradient-correlation loss term and a feature reconstruction loss term. The trained machine learning algorithm is then stored with the computer system for later use.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are systems and methods for reconstructing images from data acquired using an ultra-fast-pitch acquisition with a CT system. As an example, an ultra-fast-pitch acquisition mode in single-source helical CT (p>1.5) can be used to acquire data, which are input to a convolutional neural network-based approach to reduce artifacts on images reconstructed from insufficient data acquired in the ultra-fast-pitch mode. For dual-source CT systems, a pitch of p≥3.4 can be used. This custom-designed neural network, referred to as ultra-fast-pitch image reconstruction neural network (UFP-net) includes functional modules using both local and non-local operators, as well as the z-coordinate of each image, to effectively suppress the location- and structure-dependent artifacts induced by the ultra-fast-pitch mode. The UFP-net can be trained using a customized loss function that involves image-gradient-correlation loss and feature reconstruction loss.

Compared to filtered-back-projection (FBP), the UFP-net largely suppresses image artifacts and restores anatomical details. In a non-limiting example, the structural similarity index (SSIM) was significantly improved (Mean SSIM: UFP-net 0.9, FBP 0.6), and the root-mean-square-error (RMSE) of images reconstructed using a UFP-net was largely reduced (Mean RMSE: UFP-net 57 HU, FBP 273 HU) relative to images reconstructed with conventional FBP techniques. In this way, the systems and methods described in the present disclosure enable ultra-fast-pitch data acquisitions on single-source CT scanners to improve scanning speed while maintaining image quality.

Figure 1A:
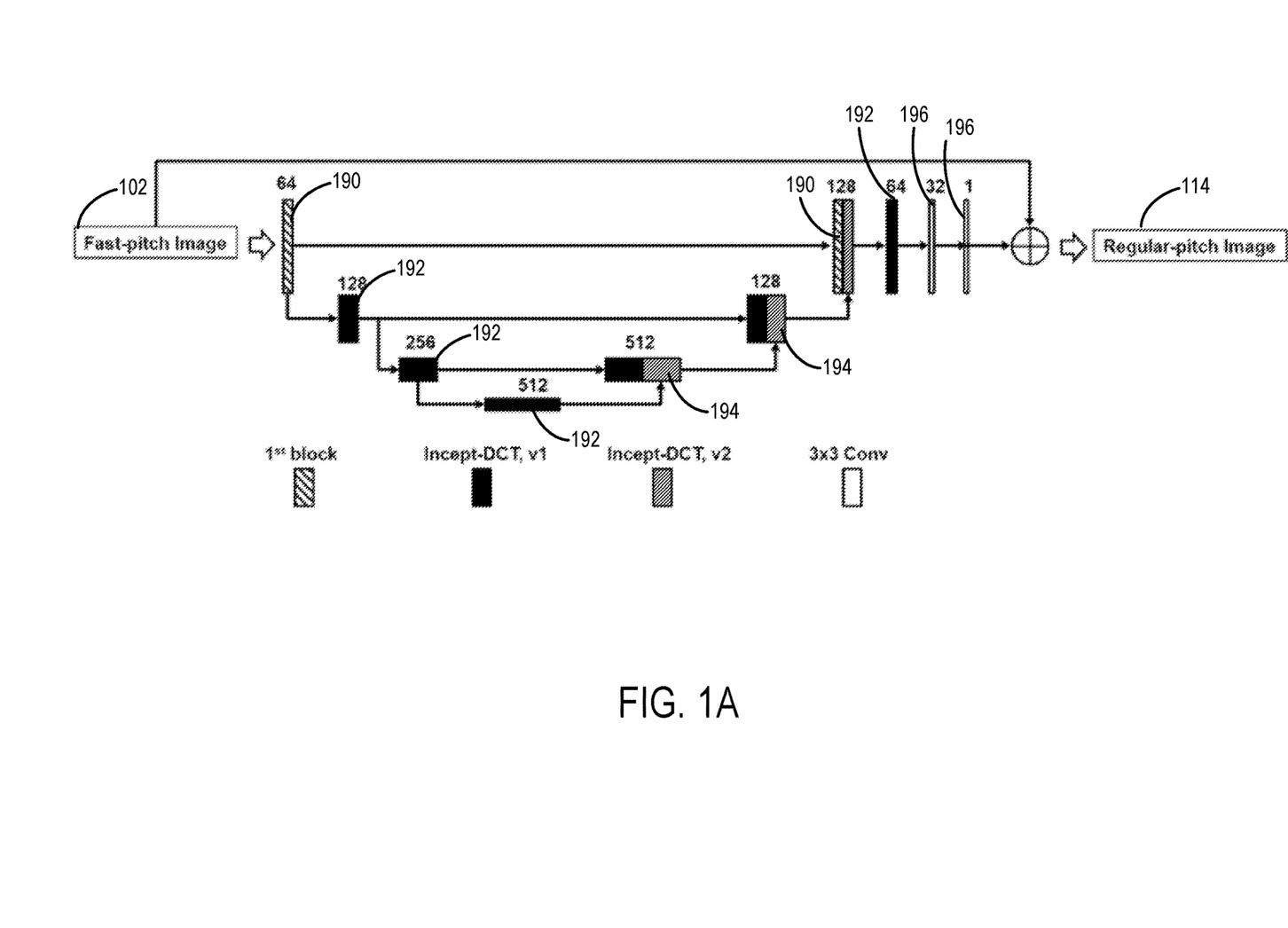
FIG. 1A is a schematic illustration of a non-limiting example UFP-net for reconstructing images from ultra-fast-pitch CT data.
Figure 1B:
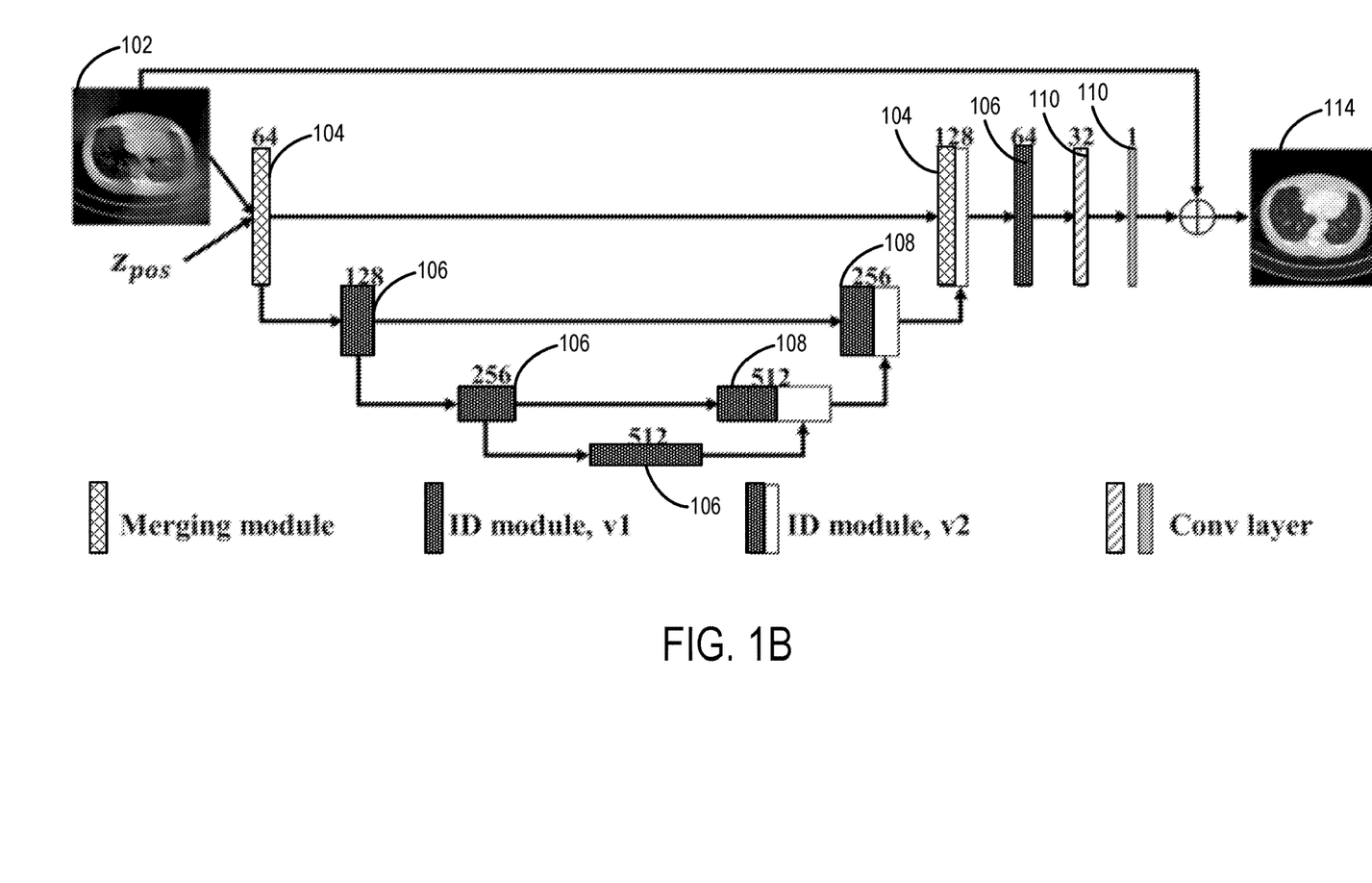
FIG. 1B is a schematic illustration of another non-limiting example UFP-net for reconstructing images from ultra-fast-pitch CT data, and which includes the following functional modules: a merging module, two versions of ID modules, and additional standard convolutional layers.

A non-limiting example architecture of a UFP-net is presented in FIGS. 1A and 1B. Referring to FIG. 1A, a non-limiting example UFP-net is shown that includes fast-pitch input images 102, a fist block 190, incept-DCT v1 module 192, incept-DCT v2 module 194, and 3×3 convolution layers 196. Output 114 may be in the form of a regular-pitch image, as shown in FIG. 1A.

Referring to FIG. 1B, a non-limiting example UFP-net uses the artifact-corrupted CT images acquired at ultra-fast-pitch (termed as ultra-fast-pitch images) and the corresponding coordinates along z-direction (denoted as $Z_{pos}$) as the inputs to predict the CT images acquired with regular-pitch (termed as regular-pitch images) at the same $Z_{pos}$. $Z_{pos}$ is a non-limiting example, and it is to be appreciated that other types of information e.g. angular range, starting angle, and the like, may be used in accordance with the present disclosure.

The UFP-net of FIG. 1B includes three types of functional modules: a merging module 104, an inception-DCT-v1 module 106 (i.e., ID-module, v1), and an inception-DCT-v2 module 108 (i.e., ID-module, v2). The merging module 104 incorporates the low-level feature maps of fast-pitch input images 102 with a non-linear bias that is dependent on $Z_{pos}$. Both types of ID-modules 106 and 108 implement a hybrid of local convolutional operators and non-local operators to model the locally-/globally-varying image structure. Convolutional layers 110 may be implemented as part of the architecture. As one example, the 2D discrete cosine transformation ("DCT") is selected as the non-local operator in order to effectively enlarge the CNN receptive field to the entire input images 102. In other implementations, non-local operators other than 2D DCT can be used, such as other global image transformations. An example of such an inception-DCT module is shown in FIG. 1B.

Figure 1C:
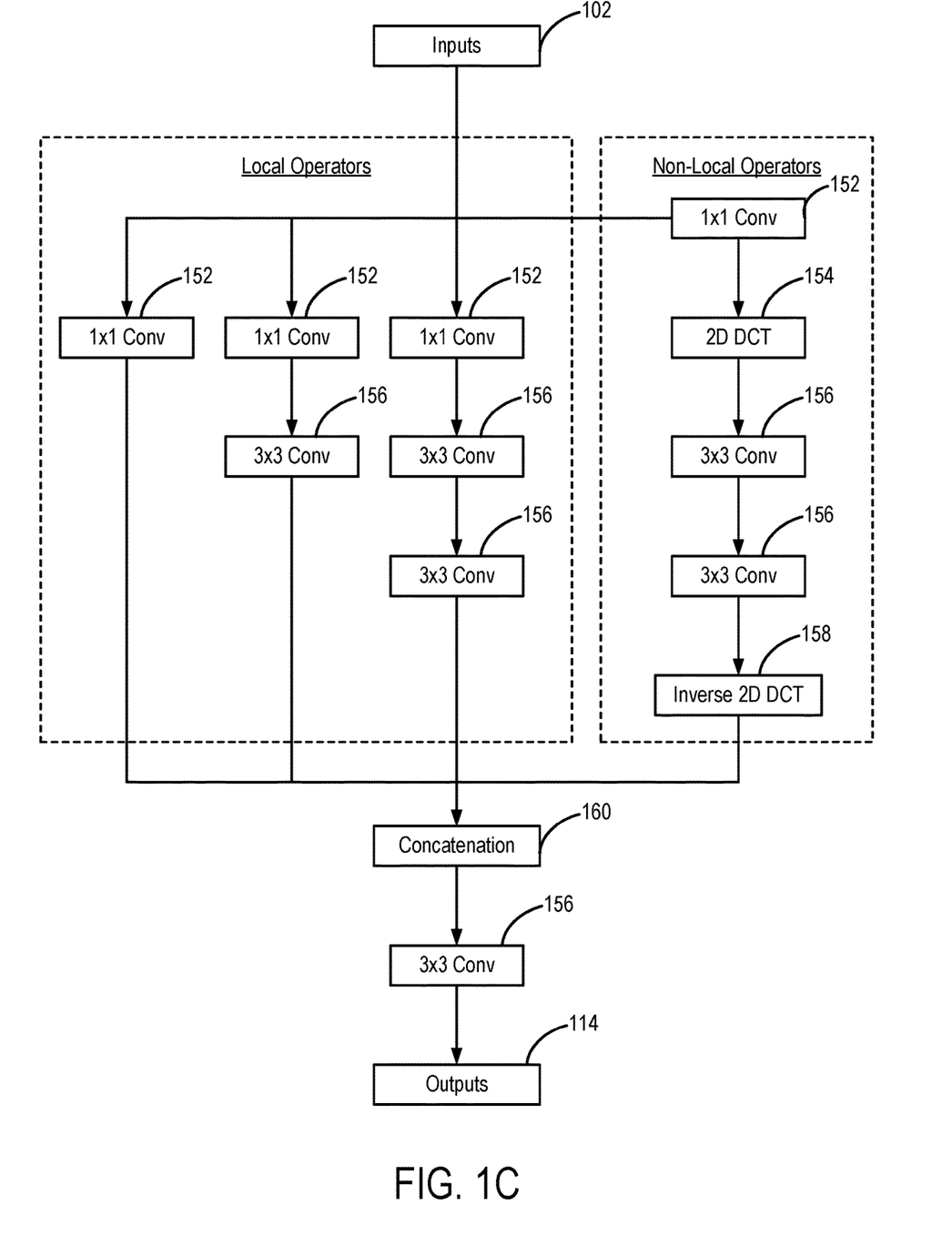
FIG. 1C shows an example of an inception-DCT module that can be implemented in the UFP-net of FIG. 1A or FIG. 1B.

Referring to FIG. 1C, a non-limiting example of an inception-DCT module that can be implemented in the UFP-net of FIG. 1A or 1B is shown. 1×1 convolution layer 152, 2 D DCT layer 154, 3×3 convolution layer 156, and inverse 2D DCT 158 may be used with local operators and non-local operators in an inception-DCT module. Concatenation 160 may assemble data from the local operators and non-local operators when forming output 114.

Furthermore, UFP-net utilizes residual learning by adding a shortcut connection between the inputs 102 and outputs 114 (i.e., the CNN actually learns the representation of image artifacts and then removes it from the fast-pitch images). As shown in FIG. 1A, the UFP-net can include an expanding path and a contracting path.

The UFP-net may be trained by minimizing a loss function that implements a mean-square-error ("MSE") term, an image-gradient correlation ("IGC") based loss term, and a feature reconstruction loss term. Additionally or alternatively, the loss function may include a similarity index term. An example of a loss function with an MSE term, an IGC-based loss term, and a feature reconstruction loss term may be as follows:

$$L(f_{CNN}) = \left(\frac{1}{M}\sum_{m=1}^{M}\|f_{CNN,m} - f_{GT,m}\|_2^2\right) + \qquad (1)$$

$$\frac{1}{\rho(\nabla f_{CNN}, \nabla f_{GT}) + \varepsilon} + \lambda\left(\sum_{n=1}^{N}\|\phi(f_{CNN,m}) - \phi(f_{GT,m})\|_2^2\right);$$

$$\nabla f_{i,j,k} = |f_{i+1,j,k} - f_{i,j,k}| + |f_{i,j+1,k} - f_{i,j,k}|; \qquad (2)$$

where $f_{CNN}$ and $f_{GT}$ denote CNN outputs (with fast-pitch) and reference images (with regular-pitch), respectively; M denotes the number of training samples per mini-batch; $\rho(\cdot)$ denotes Pearson's product-moment correlation coefficient; $\nabla(\cdot)$ of both Eqns. (1) and (2) denotes the anisotropic form of image gradient per image pixel; $\emptyset(\cdot)$ denotes the feature maps extracted from a pre-trained VGG-19 network; N denotes the number of pre-selected layers at which feature maps were extracted; and $\lambda$ denotes a relaxation parameter. Of note, the feature reconstruction loss was originally proposed for texture synthesis and style transfer tasks in computer vision field, whereas it is used here as additional sparsity constraint to match the sparse features of UFP-net outputs and reference CT images. It will be appreciated that loss functions other than the loss function shown in Eqn. (1) can also be used. As one non-limiting example, the loss function could minimize artifact features in an image that is a second order loss function. For example, the projection output of the CNN that minimized noise can be input to a filtered backprojection. The difference in the before and after images computed from the projections can then be minimized.

Figure 2:
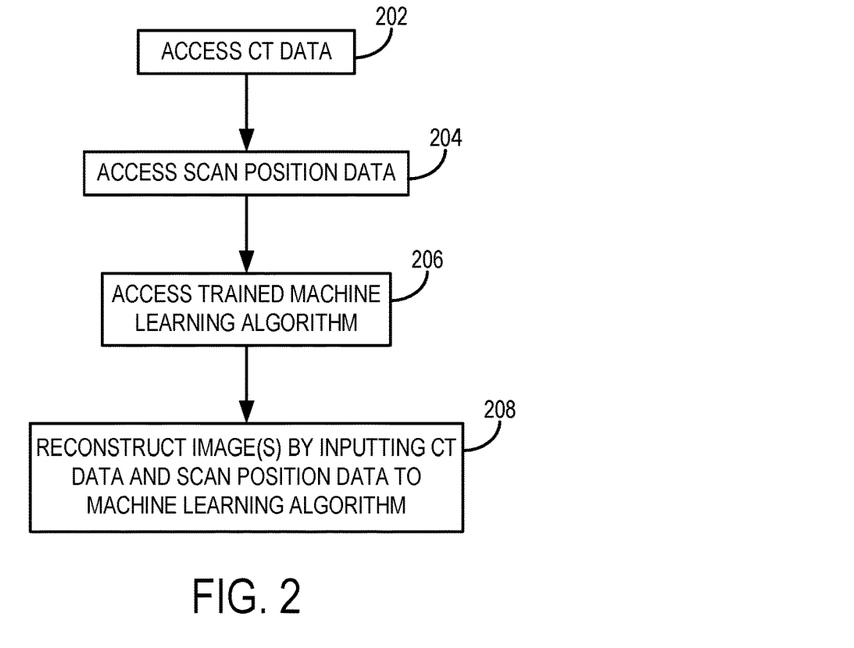
FIG. 2 is a flowchart setting forth the steps of an example method for reconstructing one or more images of a subject from ultra-fast-pitch CT data using a suitably trained machine learning algorithm.

Referring now to FIG. 2, a flowchart is illustrated as setting forth the steps of an example method for reconstructing one or more images of a subject from data acquired with a CT system using a trained machine learning algorithm that has been trained on relevant training data to reconstruct images with reduced image artifacts.

The method includes accessing CT data with a computer system, as indicated at step 202. Accessing the CT data with the computer system may include retrieving the data from a memory or other suitable data storage device or medium. In other instances, accessing the CT data with the computer system may include acquiring the data with a CT system and transferring or otherwise communicating the data to the computer system, which may be a part of the CT system. The CT data may be acquired with an ultra-fast-pitch ("UFP") acquisition using a single-source CT system. In general, a UFP acquisition includes acquiring CT data using a helical scan having a pitch greater than 1.5. In other implementations, a UFP acquisition may include acquiring CT data using a helical scan having a pitch greater than or equal to 1.75, or greater than or equal to 2.0. Further, when using a dual-source CT system, the pitch can be greater than or equal to 3.4. The CT data can be projection data or images reconstructed from such projection data (i.e., image space data).

Scan geometry data are also accessed with the computer system, as indicated at step 204. The scan geometry data indicate, for instance, the z-positions at which CT data were acquired.

A trained machine learning algorithm is then accessed with the computer system, as indicated at step 206. Accessing the trained machine learning algorithm may include, for instance, accessing weights, biases, or both, which have been computed or otherwise estimated by training the machine learning algorithm on training data. When the machine learning algorithm implements a neural network, accessing the trained machine learning algorithm may include retrieving or otherwise accessing the particular neural network architecture to be implemented. For instance, data pertaining to the layers in the neural network architecture (e.g., number of layers, type of layers, ordering of layers, connections between layers) may be retrieved or otherwise accessed.

The CT data and the scan geometry data are then input to the trained machine learning algorithm(s) in order to reconstruct one or more images, as indicated at step 208. As noted above, the UFP-net described in the present disclosure uses the artifact-corrupted CT images acquired at ultra-fast-pitch (termed as ultra-fast-pitch images), and in some configurations may include the corresponding coordinates along z-direction (denoted as $Z_{pos}$) as the inputs to predict the CT images acquired with regular-pitch (termed as regular-pitch images) at the same $Z_{pos}$. Angular range, starting angle, and the like may also be used in a similar manner as $Z_{pos}$.

Figure 3:
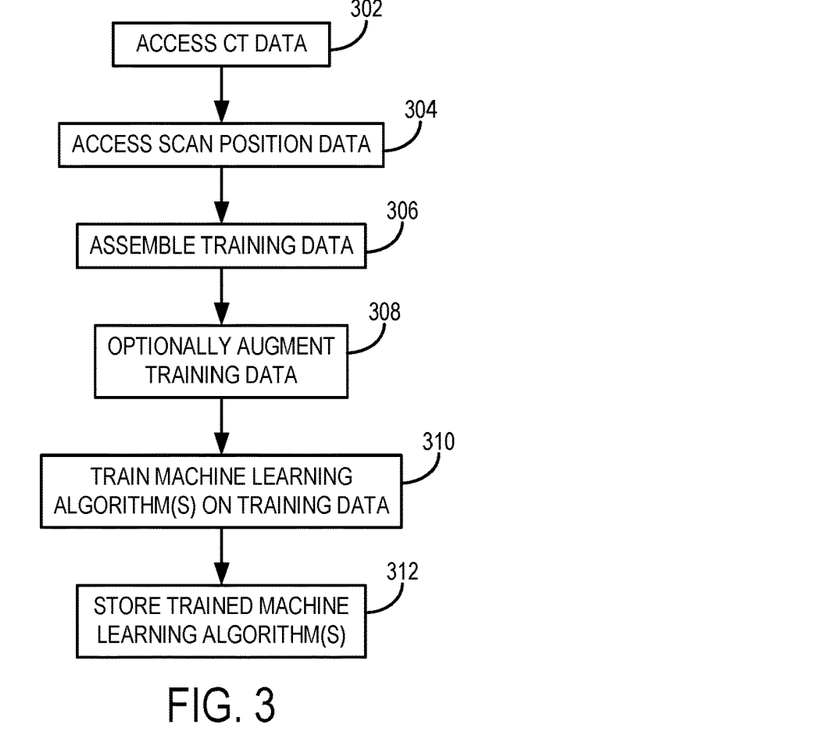
FIG. 3 is a flowchart setting forth the steps of an example method for training a machine learning algorithm for reconstructing images from ultra-fast-pitch CT data.

Referring now to FIG. 3, a flowchart is illustrated as setting forth the steps of an example method for training one or more machine learning algorithms on training data, such that the one or more machine learning algorithms are trained to receive input as CT data and scan position in order to generate output as reconstructed images in which artifacts have been reduced.

The method includes accessing CT data, as indicated at step 302. As described above, the CT data can be projection data, or images reconstructed from such projection data. Additionally or alternatively, the CT data can be simulated CT data, whether projection data or images. The training CT data can be acquired from a subject (or multiple subject), from a phantom, or combinations thereof. Scan geometry data corresponding to each scan used to obtain CT data are also accessed with the computer system, as indicated at step 304.

Training data are assembled next, as indicated at step 306. Assembling the training data may include assembling CT data, scan geometry data, and other relevant data. For instance, assembling the training data may include generating labeled data and including the labeled data in the training data. Labeled data may include CT data that have been labeled based on the z-position at which they were acquired, as indicated by the corresponding scan geometry data. In some implementations, assembling the training data may also include computing reformatted CT data. For instance, the CT data may be data acquired (or simulation) without an ultra-fast pitch (e.g., with p≤1.5), such as data acquired with a regular pitch. These CT data can then be reformatted to ultra-fast-pitch data, such as by resampling the data. The reformatted data can then be included in the assembled training data.

Optionally, the training data can be augmented using data augmentation techniques, as indicated at step 308. For example, any number of several different data augmentation strategies can be used. As one example, a linear interpolation along the z-direction (termed as z-interpolation) can be used to rapidly increase the number of training samples. Additional training images can also be generated by down-sampling the patient images by a selected amount (e.g., 50%), or by random rotation/mirroring. Such data augmentation techniques can be used to generate upwards of 130,000 training images.

One or more machine learning algorithms are trained on the training data, as indicated at step 310. The machine learning algorithm can be any suitable machine learning algorithm, and in some instances includes a machine learning algorithm based on an artificial neural network ("ANN"). The ANN may be a convolutional neural network. In any such instance, the machine learning algorithm can be trained using, in part, a loss function. As described above, an example loss function includes an image-gradient correlation based loss term and a feature reconstruction loss term.

As one example, the UFP-net can be trained using an incremental learning strategy that involves multiple training stages. For example, the number of stages could be two or more. As one example, the number of stages can be four. In the first stage(s), down-sampled images (e.g., 64×64) are used for the first N training epochs. As one example, N may be 40. The, the image size is increased in the second and third stages. For instance, the image size can be increased to 128×128 in the second stage and to 256×256 in the third stage. The corresponding training epochs could both be 20. In the last stage, the UFP-net is fine-tuned using the standard-sized (e.g., 512×512) training images for another 2 epochs. Adam optimizer can be used in both stages. In some instances, the learning rate can be reduced in the last stage. For instance, the learning rate can be reduced by 10 times at the last stage. A gradient clipping regularization can be used in the second stage to confine the gradients of network parameters within the range of [0.0, 1.0].

The one or more trained machine learning algorithms are then stored for later use, as indicated at step 312. Storing the machine learning algorithms may include storing weights, biases, or both, which have been computed or otherwise estimated by training the machine learning algorithm on the training data. When the machine learning algorithm implements a neural network, storing the trained machine learning algorithm may include storing the particular neural network architecture to be implemented. For instance, data pertaining to the layers in the neural network architecture (e.g., number of layers, type of layers, ordering of layers, connections between layers) may be stored.

Figure 4A:
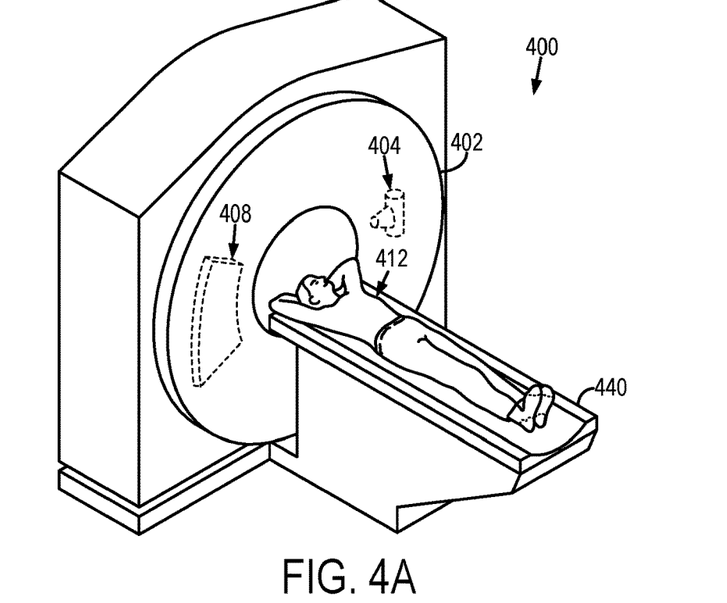
FIG. 4A is a profile view of an example CT system that can implement the methods described in the present disclosure.
Figure 4B:
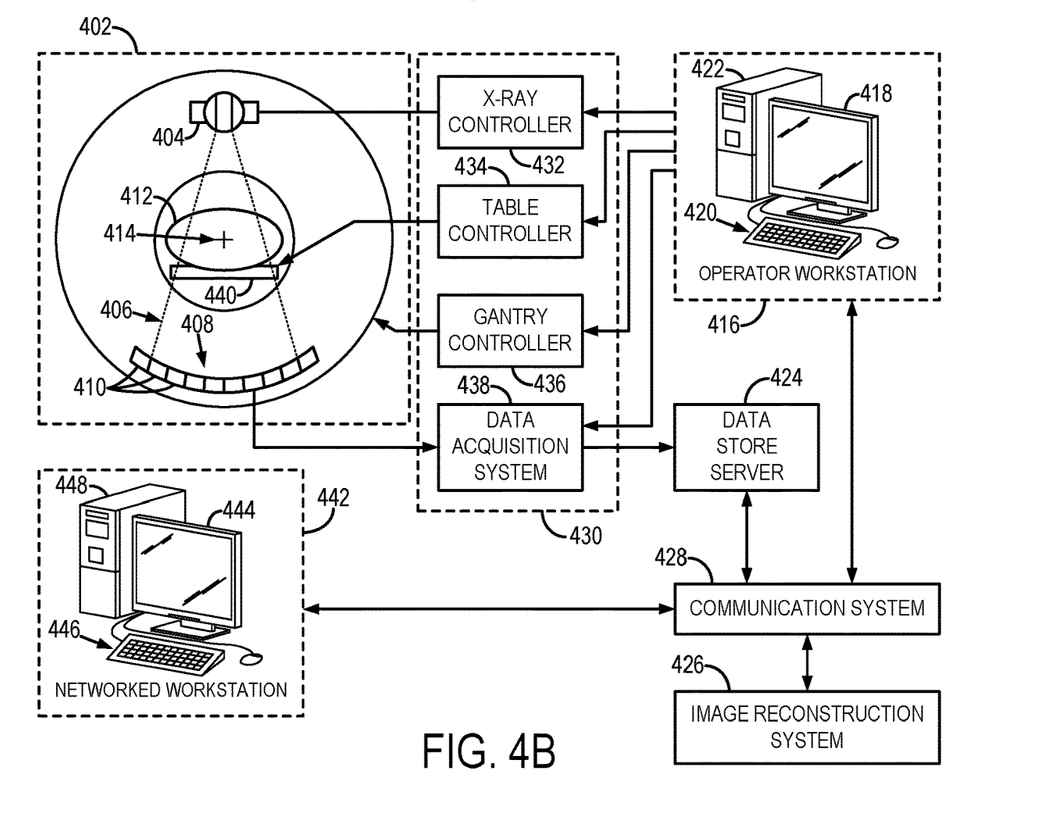
FIG. 4B is a block diagram of the example CT system of FIG. 4A that can implement the methods described in the present disclosure.

Referring particularly now to FIGS. 4A and 4B, an example of an x-ray computed tomography ("CT") imaging system 400 is illustrated. The CT system includes a gantry 402, to which at least one x-ray source 404 is coupled. The x-ray source 404 projects an x-ray beam 406, which may be a fan-beam or cone-beam of x-rays, towards a detector array 408 on the opposite side of the gantry 402. The detector array 408 includes a number of x-ray detector elements 410. Together, the x-ray detector elements 410 sense the projected x-rays 406 that pass through a subject 412, such as a medical patient or an object undergoing examination, that is positioned in the CT system 400. Each x-ray detector element 410 produces an electrical signal that may represent the intensity of an impinging x-ray beam and, hence, the attenuation of the beam as it passes through the subject 412. In some configurations, each x-ray detector 410 is capable of counting the number of x-ray photons that impinge upon the detector 410. During a scan to acquire x-ray projection data, the gantry 402 and the components mounted thereon rotate about a center of rotation 414 located within the CT system 400.

The CT system 400 also includes an operator workstation 416, which typically includes a display 418; one or more input devices 420, such as a keyboard and mouse; and a computer processor 422. The computer processor 422 may include a commercially available programmable machine running a commercially available operating system. The operator workstation 416 provides the operator interface that enables scanning control parameters to be entered into the CT system 400. In general, the operator workstation 416 is in communication with a data store server 424 and an image reconstruction system 426. By way of example, the operator workstation 416, data store server 424, and image reconstruction system 426 may be connected via a communication system 428, which may include any suitable network connection, whether wired, wireless, or a combination of both. As an example, the communication system 428 may include both proprietary or dedicated networks, as well as open networks, such as the internet.

The operator workstation 416 is also in communication with a control system 430 that controls operation of the CT system 400. The control system 430 generally includes an x-ray controller 432, a table controller 434, a gantry controller 436, and a data acquisition system 438. The x-ray controller 432 provides power and timing signals to the x-ray source 404 and the gantry controller 436 controls the rotational speed and position of the gantry 402. The table controller 434 controls a table 440 to position the subject 412 in the gantry 402 of the CT system 400.

The DAS 438 samples data from the detector elements 410 and converts the data to digital signals for subsequent processing. For instance, digitized x-ray data is communicated from the DAS 438 to the data store server 424. The image reconstruction system 426 then retrieves the x-ray data from the data store server 424 and reconstructs an image therefrom. The image reconstruction system 426 may include a commercially available computer processor, or may be a highly parallel computer architecture, such as a system that includes multiple-core processors and massively parallel, high-density computing devices. Optionally, image reconstruction can also be performed on the processor 422 in the operator workstation 416. Reconstructed images can then be communicated back to the data store server 424 for storage or to the operator workstation 416 to be displayed to the operator or clinician.

The CT system 400 may also include one or more networked workstations 442. By way of example, a networked workstation 442 may include a display 444; one or more input devices 446, such as a keyboard and mouse; and a processor 448. The networked workstation 442 may be located within the same facility as the operator workstation 416, or in a different facility, such as a different healthcare institution or clinic.

The networked workstation 442, whether within the same facility or in a different facility as the operator workstation 416, may gain remote access to the data store server 424 and/or the image reconstruction system 426 via the communication system 428. Accordingly, multiple networked workstations 442 may have access to the data store server 424 and/or image reconstruction system 426. In this manner, x-ray data, reconstructed images, or other data may be exchanged between the data store server 424, the image reconstruction system 426, and the networked workstations 442, such that the data or images may be remotely processed by a networked workstation 442. This data may be exchanged in any suitable format, such as in accordance with the transmission control protocol ("TCP"), the internet protocol ("IP"), or other known or suitable protocols.

Figure 5:
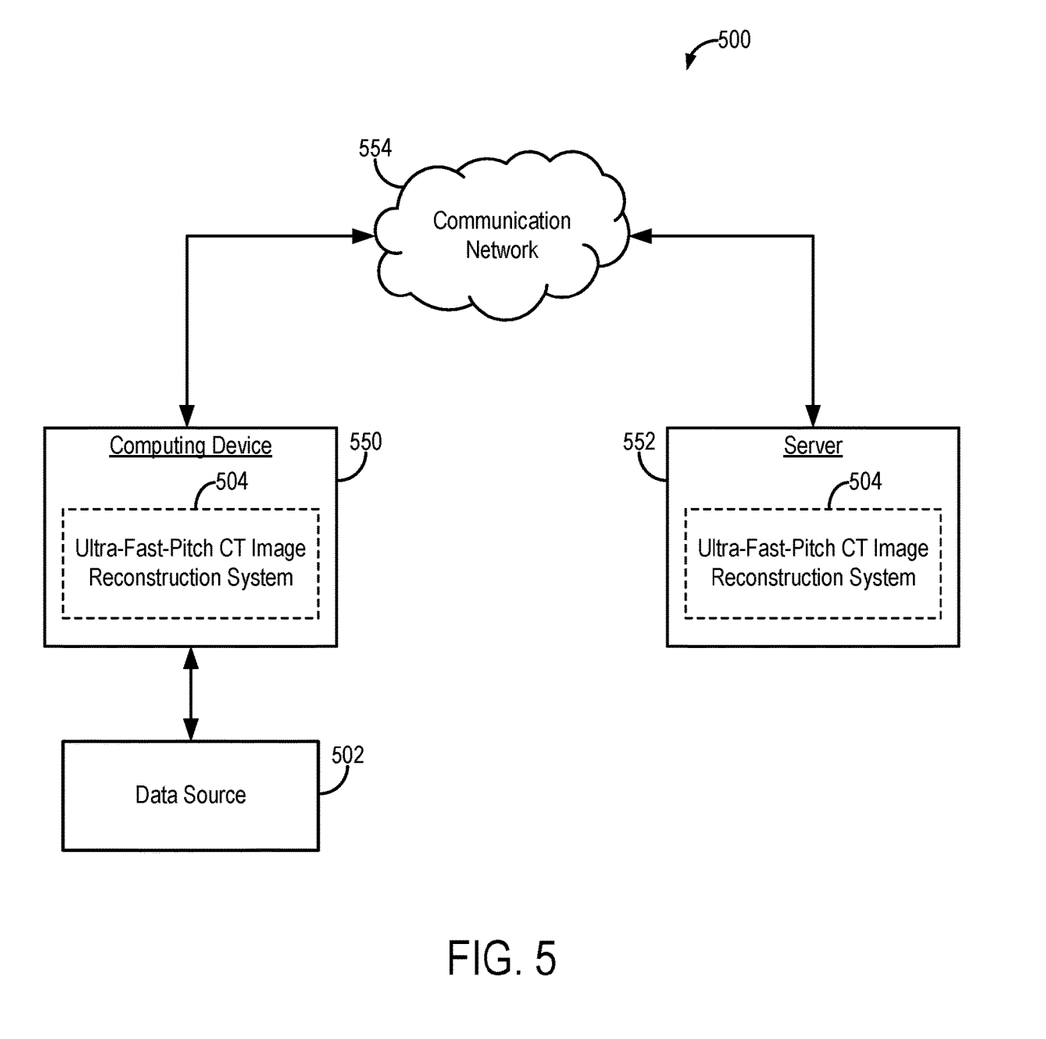
FIG. 5 is a block diagram of an example ultra-fast-pitch CT image reconstruction system.

Referring now to FIG. 5, an example of a system 500 for reconstructing image from ultra-fast-pitch CT data in accordance with some embodiments of the systems and methods described in the present disclosure is shown. As shown in FIG. 5, a computing device 550 can receive one or more types of data (e.g., ultra-fast-pitch CT data, regular-pitch CT data, scan geometry data) from data source 502, which may be a CT data source. In some embodiments, computing device 550 can execute at least a portion of an ultra-fast-pitch CT image reconstruction system 504 to reconstructing images from data received from the data source 502.

Additionally or alternatively, in some embodiments, the computing device 550 can communicate information about data received from the data source 502 to a server 552 over a communication network 554, which can execute at least a portion of the ultra-fast-pitch CT image reconstruction system. In such embodiments, the server 552 can return information to the computing device 550 (and/or any other suitable computing device) indicative of an output of the ultra-fast-pitch CT image reconstruction system 504.

In some embodiments, computing device 550 and/or server 552 can be any suitable computing device or combination of devices, such as a desktop computer, a laptop computer, a smartphone, a tablet computer, a wearable computer, a server computer, a virtual machine being executed by a physical computing device, and so on. The computing device 550 and/or server 552 can also reconstruct images from the data.

In some embodiments, data source 502 can be any suitable source of image data (e.g., measurement data, images reconstructed from measurement data), such as a CT system, another computing device (e.g., a server storing image data), and so on. In some embodiments, data source 502 can be local to computing device 550. For example, data source 502 can be incorporated with computing device 550 (e.g., computing device 550 can be configured as part of a device for capturing, scanning, and/or storing images). As another example, data source 502 can be connected to computing device 550 by a cable, a direct wireless link, and so on. Additionally or alternatively, in some embodiments, data source 502 can be located locally and/or remotely from computing device 550, and can communicate data to computing device 550 (and/or server 552) via a communication network (e.g., communication network 554).

In some embodiments, communication network 554 can be any suitable communication network or combination of communication networks. For example, communication network 554 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 554 can be a local area network, a wide area network, a public network (e.g., the Internet), a private or semi-private network (e.g., a corporate or university intranet), any other suitable type of network, or any suitable combination of networks. Communications links shown in FIG. 5 can each be any suitable communications link or combination of communications links, such as wired links, fiber optic links, Wi-Fi links, Bluetooth links, cellular links, and so on.

Figure 6:
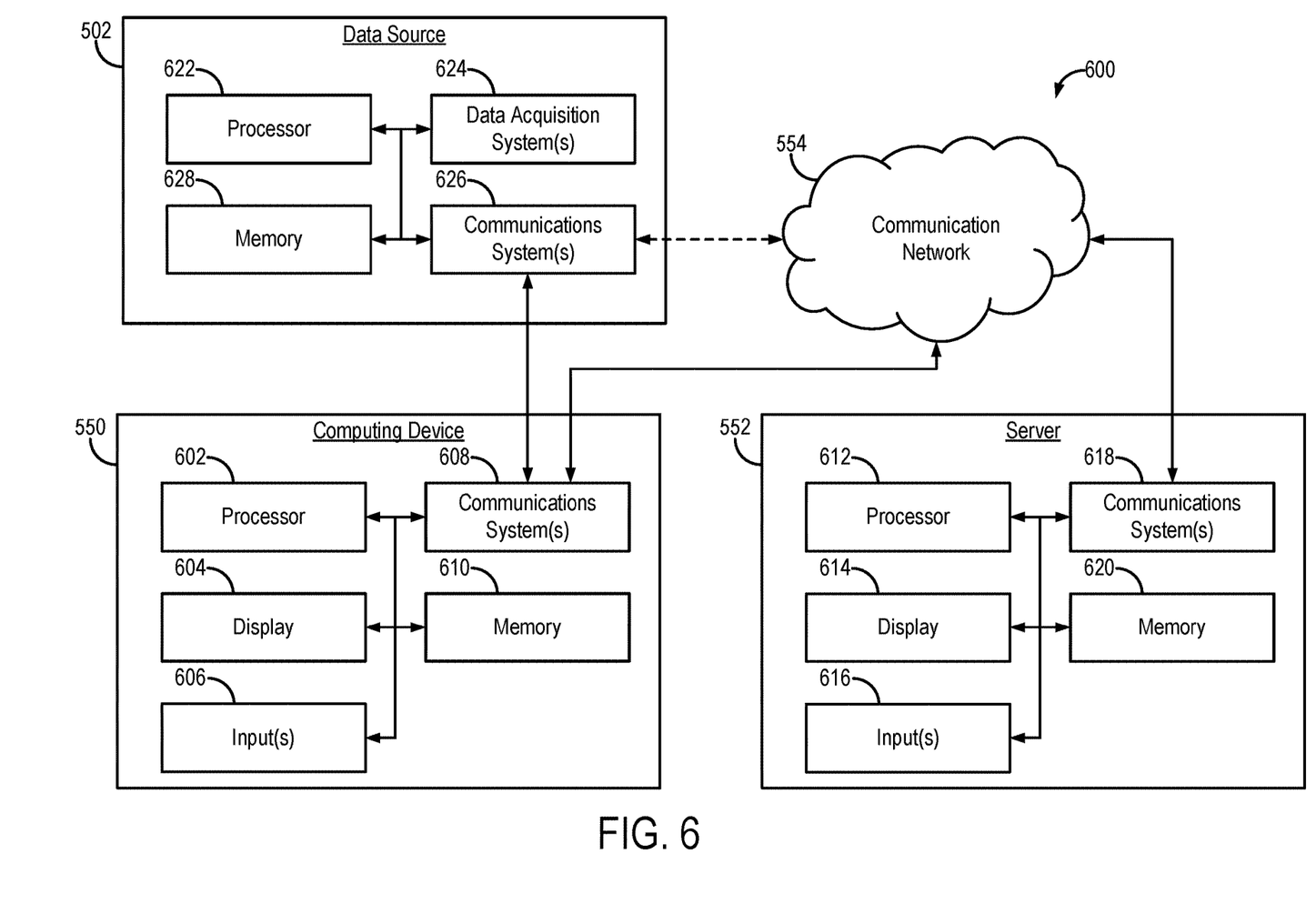
FIG. 6 is a block diagram of example components that can be used to implement the system of FIG. 5.

Referring now to FIG. 6, an example of hardware 600 that can be used to implement data source 502, computing device 550, and server 552 in accordance with some embodiments of the systems and methods described in the present disclosure is shown. As shown in FIG. 6, in some embodiments, computing device 550 can include a processor 602, a display 604, one or more inputs 606, one or more communication systems 608, and/or memory 610. In some embodiments, processor 602 can be any suitable hardware processor or combination of processors, such as a central processing unit ("CPU"), a graphics processing unit ("GPU"), and so on. In some embodiments, display 604 can include any suitable display devices, such as a computer monitor, a touchscreen, a television, and so on. In some embodiments, inputs 606 can include any suitable input devices and/or sensors that can be used to receive user input, such as a keyboard, a mouse, a touchscreen, a microphone, and so on.

In some embodiments, communications systems 608 can include any suitable hardware, firmware, and/or software for communicating information over communication network 554 and/or any other suitable communication networks. For example, communications systems 608 can include one or more transceivers, one or more communication chips and/or chip sets, and so on. In a more particular example, communications systems 608 can include hardware, firmware and/or software that can be used to establish a Wi-Fi connection, a Bluetooth connection, a cellular connection, an Ethernet connection, and so on.

In some embodiments, memory 610 can include any suitable storage device or devices that can be used to store instructions, values, data, or the like, that can be used, for example, by processor 602 to present content using display 604, to communicate with server 552 via communications system(s) 608, and so on. Memory 610 can include any suitable volatile memory, non-volatile memory, storage, or any suitable combination thereof. For example, memory 610 can include RAM, ROM, EEPROM, one or more flash drives, one or more hard disks, one or more solid state drives, one or more optical drives, and so on. In some embodiments, memory 610 can have encoded thereon, or otherwise stored therein, a computer program for controlling operation of computing device 550. In such embodiments, processor 602 can execute at least a portion of the computer program to present content (e.g., images, user interfaces, graphics, tables), receive content from server 552, transmit information to server 552, and so on.

In some embodiments, server 552 can include a processor 612, a display 614, one or more inputs 616, one or more communications systems 618, and/or memory 620. In some embodiments, processor 612 can be any suitable hardware processor or combination of processors, such as a CPU, a GPU, and so on. In some embodiments, display 614 can include any suitable display devices, such as a computer monitor, a touchscreen, a television, and so on. In some embodiments, inputs 616 can include any suitable input devices and/or sensors that can be used to receive user input, such as a keyboard, a mouse, a touchscreen, a microphone, and so on.

In some embodiments, communications systems 618 can include any suitable hardware, firmware, and/or software for communicating information over communication network 554 and/or any other suitable communication networks. For example, communications systems 618 can include one or more transceivers, one or more communication chips and/or chip sets, and so on. In a more particular example, communications systems 618 can include hardware, firmware and/or software that can be used to establish a Wi-Fi connection, a Bluetooth connection, a cellular connection, an Ethernet connection, and so on.

In some embodiments, memory 620 can include any suitable storage device or devices that can be used to store instructions, values, data, or the like, that can be used, for example, by processor 612 to present content using display 614, to communicate with one or more computing devices 550, and so on. Memory 620 can include any suitable volatile memory, non-volatile memory, storage, or any suitable combination thereof. For example, memory 620 can include RAM, ROM, EEPROM, one or more flash drives, one or more hard disks, one or more solid state drives, one or more optical drives, and so on. In some embodiments, memory 620 can have encoded thereon a server program for controlling operation of server 552. In such embodiments, processor 612 can execute at least a portion of the server program to transmit information and/or content (e.g., data, images, a user interface) to one or more computing devices 550, receive information and/or content from one or more computing devices 550, receive instructions from one or more devices (e.g., a personal computer, a laptop computer, a tablet computer, a smartphone), and so on.

In some embodiments, data source 502 can include a processor 622, one or more data acquisition systems 624, one or more communications systems 626, and/or memory 628. In some embodiments, processor 622 can be any suitable hardware processor or combination of processors, such as a CPU, a GPU, and so on. In some embodiments, the one or more data acquisition systems 624 are generally configured to acquire data, images, or both, and can include a CT system. Additionally or alternatively, in some embodiments, one or more data acquisition systems 624 can include any suitable hardware, firmware, and/or software for coupling to and/or controlling operations of a CT system. In some embodiments, one or more portions of the one or more data acquisition systems 624 can be removable and/or replaceable.

Note that, although not shown, data source 502 can include any suitable inputs and/or outputs. For example, data source 502 can include input devices and/or sensors that can be used to receive user input, such as a keyboard, a mouse, a touchscreen, a microphone, a trackpad, a trackball, and so on. As another example, data source 502 can include any suitable display devices, such as a computer monitor, a touchscreen, a television, etc., one or more speakers, and so on.

In some embodiments, communications systems 626 can include any suitable hardware, firmware, and/or software for communicating information to computing device 550 (and, in some embodiments, over communication network 554 and/or any other suitable communication networks). For example, communications systems 626 can include one or more transceivers, one or more communication chips and/or chip sets, and so on. In a more particular example, communications systems 626 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 628 can include any suitable storage device or devices that can be used to store instructions, values, data, or the like, that can be used, for example, by processor 622 to control the one or more data acquisition systems 624, and/or receive data from the one or more data acquisition systems 624; to images from data; present content (e.g., images, a user interface) using a display; communicate with one or more computing devices 550; and so on. Memory 628 can include any suitable volatile memory, non-volatile memory, storage, or any suitable combination thereof. For example, memory 628 can include RAM, ROM, EEPROM, one or more flash drives, one or more hard disks, one or more solid state drives, one or more optical drives, and so on. In some embodiments, memory 628 can have encoded thereon, or otherwise stored therein, a program for controlling operation of data source 502. In such embodiments, processor 622 can execute at least a portion of the program to generate images, transmit information and/or content (e.g., data, images) to one or more computing devices 550, receive information and/or content from one or more computing devices 550, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for reconstructing an image of a subject from data acquired with a computed tomography (CT) system, the method comprising:
(a) acquiring data with the CT system from the subject using an ultra-fast-pitch scan in which data are acquired using a helical scan with a pitch of more than 1.5;
(b) accessing with a computer system, scan geometry data that indicate positions along a scan path at which the data were acquired;
(c) reconstructing one or more images of the subject with the computer system by inputting the data and the scan geometry data to a trained machine learning algorithm, generating output as the one or more images of the subject, wherein image artifacts associated with the ultra-fast-pitch scan are mitigated in the one or more images of the subject.

2. The method of claim 1, wherein the trained machine learning algorithm comprises a neural network.

3. The method of claim 2, wherein the neural network is a convolutional neural network.

4. The method of claim 2, wherein the neural network comprises one or more merging modules that incorporate low-level feature maps of fast-pitch images with a non-linear bias that is dependent on the scan geometry data.

5. The method of claim 2, wherein the neural network comprises one or more inception modules that implement a hybrid of local convolutional operators and non-local operators to model locally and globally varying image structures.

6. The method of claim 5, wherein the non-local operators comprise discrete cosine transformations.

7. The method of claim 1, wherein the trained machine learning algorithm is trained on training data comprising:
training CT data comprising regular pitch data associated with a pitch less than or equal to 1.5 and ultra-fast-pitch data associated with a pitch more than 1.5; and
scan geometry data indicating positions along a scan path at which the training CT data were acquired; and
wherein training the machine learning algorithm includes minimizing a loss function comprising an image-gradient correlation based loss term and a feature reconstruction loss term.

8. The method of claim 7, wherein the loss function also includes a mean-square-error term.

9. The method of claim 7, wherein the image-gradient correlation based loss term comprises computing a correlation between a gradient of fast-pitch images reconstructed from the data and reference images with regular pitch.

10. The method of claim 9, wherein the correlation is a Pearson's product-moment correlation coefficient.

11. The method of claim 7, wherein the feature reconstruction loss term comprises computing a difference between feature maps extracted from fast-pitch images reconstructed from the data and reference images with regular pitch.

12. The method of claim 11, wherein the feature maps are extracted using a pretrained neural network.

13. The method of claim 12, wherein the pretrained neural network is a pretrained VGG-19 network.

14. The method of claim 7, wherein the ultra-fast-pitch data in the training CT data are generated by resampling the regular pitch data.

\* \* \* \* \*